US012794399B2

(12) United States Patent
Budge

(10) Patent No.: US 12,794,399 B2
(45) Date of Patent: Nov. 10, 2026

(54) SOLAR MODULE BALLAST DEVICE AND BRACKET

(71) Applicant: Paul W. Budge, St. George, UT (US)

(72) Inventor: Paul W. Budge, St. George, UT (US)

( * ) Notice: Subject to any disclaimer, the term of this patent is extended or adjusted under 35 U.S.C. 154(b) by 0 days.

(21) Appl. No.: 19/011,571

(22) Filed: Jan. 6, 2025

(65) Prior Publication Data

US 2025/0226788 A1 Jul. 10, 2025

Related U.S. Application Data

(60) Provisional application No. 63/630,121, filed on Jan. 4, 2024.

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC ................................ H02S 20/30; H02S 30/10
See application file for complete search history.

(56) References Cited

U.S. PATENT DOCUMENTS

2014/0366465 A1* 12/2014 Bragagna ................ H10F 19/00 52/173.3
2016/0336895 A1* 11/2016 Wildes .................... H02S 20/10
2022/0345076 A1* 10/2022 Nickerson ............... H02S 20/30
2023/0216441 A1* 7/2023 Neal ....................... H02S 20/24 136/244

FOREIGN PATENT DOCUMENTS

ES 1112181 * 6/2014
ES 1112181 U 6/2014
FR 2776850 A1 10/1999
WO 2024089517 A1 5/2024

OTHER PUBLICATIONS

PCT/US2025/010506, "Notification of Transmittal of the International Search Report and the Written Opinion of the International Searching Authority, or the Declaration", International Searching Authority, Mar. 7, 2025, pp. 1-13.

* cited by examiner

*Primary Examiner* — Jayne L Mershon
(74) *Attorney, Agent, or Firm* — Kunzler Needham Hilton

(57) ABSTRACT

Apparatuses are disclosed for use in a solar module array system. In certain examples, the apparatuses include a bracket having a base and at least two arms extending outward from the base at an angle with reference to the base, where an arm of the at least two arms is configured to couple with a solar module. Also included is a ballast device having an interior chamber configured to receive a flowable material, and where the ballast device has at least one surface feature configured to receive the bracket and secure the solar module to a mounting surface.

19 Claims, 9 Drawing Sheets

SOLAR MODULE BALLAST DEVICE AND BRACKET

CROSS-REFERENCES TO RELATED APPLICATIONS

This application claims the benefit of U.S. Provisional Patent Application No. 63/630,121 entitled "APPARATUS, SYSTEM, AND METHODE FOR BALLASTED SOLAR MODULE RACKING BRACKET WITH BLOCK CLAMP AND CARRYING HANDLE STRUCTURALLY AND INTEGRALLY CONNECTED TO BALLAST" and filed on Jan. 4, 2024, for Paul W. Budge, which is incorporated herein by reference.

FIELD

This disclosure relates generally to modular, self-supporting mounting systems of solar modules, and in particular, modular self-supporting mounting devices for mounting solar modules on a flat roof.

BACKGROUND

As solar energy becomes more popular, so do new ways to attach solar panels (also called PV modules) to different surfaces, like rooftops or the ground. Over time, these systems have been improved to make them easier and faster to install. However, some challenges remain, especially when it comes to safety and efficiency. For example, many current systems are made up of lots of parts, which can make installation slow and tricky. This is particularly concerning when workers have to install panels in difficult or dangerous places, like on rooftops.

Solar panels are used to create electricity for homes and businesses. Since one panel can only produce a small amount of electricity, several panels are usually grouped together to form what's called a PV array. These arrays are often installed on rooftops or the ground and are positioned to face south (if installed in the Northern Hemisphere) so they get the most sunlight throughout the day.

Even though there are many systems available to secure solar panels, they often have significant downsides. Some systems are expensive to make or take a long time to install. Others might require custom parts to fit specific types of panels, which makes the process more complicated. Additionally, some systems can damage the roof they're attached to, especially if they puncture the roof's protective layer. Other designs take up too much space, reducing the efficiency of the panel array. In some cases, these systems also have issues with proper grounding, which is important for safety.

Because of these challenges, there's still a lot of room to create better mounting systems for solar panels—ones that are more affordable, easier to install, eco-friendly, and safer for both the workers and the surfaces they're mounted on.

SUMMARY

Apparatuses are disclosed for use in a solar module array system. In certain examples, the apparatuses include a bracket having a base and at least two arms extending outward from the base at an angle with reference to the base, where an arm of the at least two arms is configured to couple with a solar module. Also included is a ballast device having an interior chamber configured to receive a flowable material, and where the ballast device has at least one surface feature configured to receive the bracket and secure the solar module to a mounting surface.

In certain examples, the solar module has a length and a width, and the ballast device has a length substantially equal to the length of the solar module. The ballast device, in certain examples, is disposed on the mounting surface and at least partially below a top surface of the solar module to form a wind break and limit wind penetration underneath the solar module.

In certain examples, the apparatuses include a second ballast device disposed along an opposite side of the solar module from the ballast device. The second ballast device is installed at an angle with respect to a vertical line to create downward force on the solar module when the second ballast device is impinged by wind. In certain examples, at least one arm of the at least two arms of the bracket comprises one or more barbs configured to lock the bracket into the at least one surface feature.

In certain examples, the at least one surface feature comprises a slot configured to receive at least one arm of the bracket. An end bracket is also included and has a base, an arm extending upward from the base, and an arm that is coplanar with the base, and where the end bracket is configured to couple with an anchoring device. The ballast device may include at least one opening for receiving the flowable material. In certain examples, the ballast device comprises an elongated rectangular shape.

A method of providing the apparatuses is also included.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
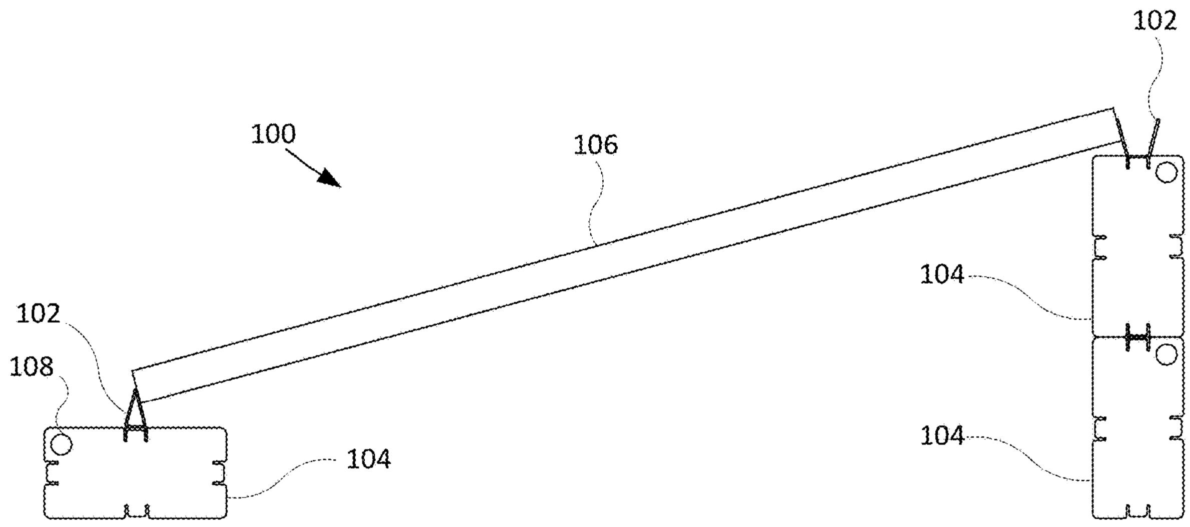
FIG. 1A is a side view diagram illustrating one example of a ballast system 100, in accordance with examples of the subject disclosure.

FIG. 1A is a side view diagram illustrating one example of a ballast system 100, in accordance with examples of the subject disclosure. The ballast system 100 includes the combined use of a bracket 102 and a ballast device 104. As will be described in greater detail below, the bracket 102 is provided in different configurations. Similarly, the ballast device 104 is also provided in different configurations. In certain examples, such as the example depicted in FIG. 1A, the ballast device 104 is a tank configured for holding a flowable material that has a weight sufficient to support one or more solar panels 106. The flowable material, in certain examples, is a liquid such as water. In other examples, the flowable material may be sand, concrete, etc. Stated differently, any material that is capable of flowing through an opening 108 and into the tank may be utilized to "weigh down" the one or more solar panels 106.

The ballast device 104 is formed, in certain examples, with a generally rectangular cross-sectional profile, as depicted. However, any suitable cross-sectional profile is contemplated. Beneficially, a substantially rectangular cross-sectional profile allows for the use of the ballast device 104 in a horizontal configuration (e.g., the left side ballast device 104) or a vertical configuration (e.g., the right side ballast device 104), without needing different sized ballast devices 104. Such different positioning options allows for the solar panel 106 to be installed on an angle, which, as is known to those skilled in the art, is helpful for maximizing photovoltaic energy production by angling the solar panel 106 towards the sun.

In certain examples, the bracket 102 is a press-fit bracket 102 that engages slots formed in the ballast device 104. The bracket 102 may have a generally H-shaped cross-sectional profile so that downwardly extending portions engage slots formed in the ballast device 104, as will be described in greater detail below. A bracket may also be used to couple and stack multiple ballast devices 104.

Figure 1B:
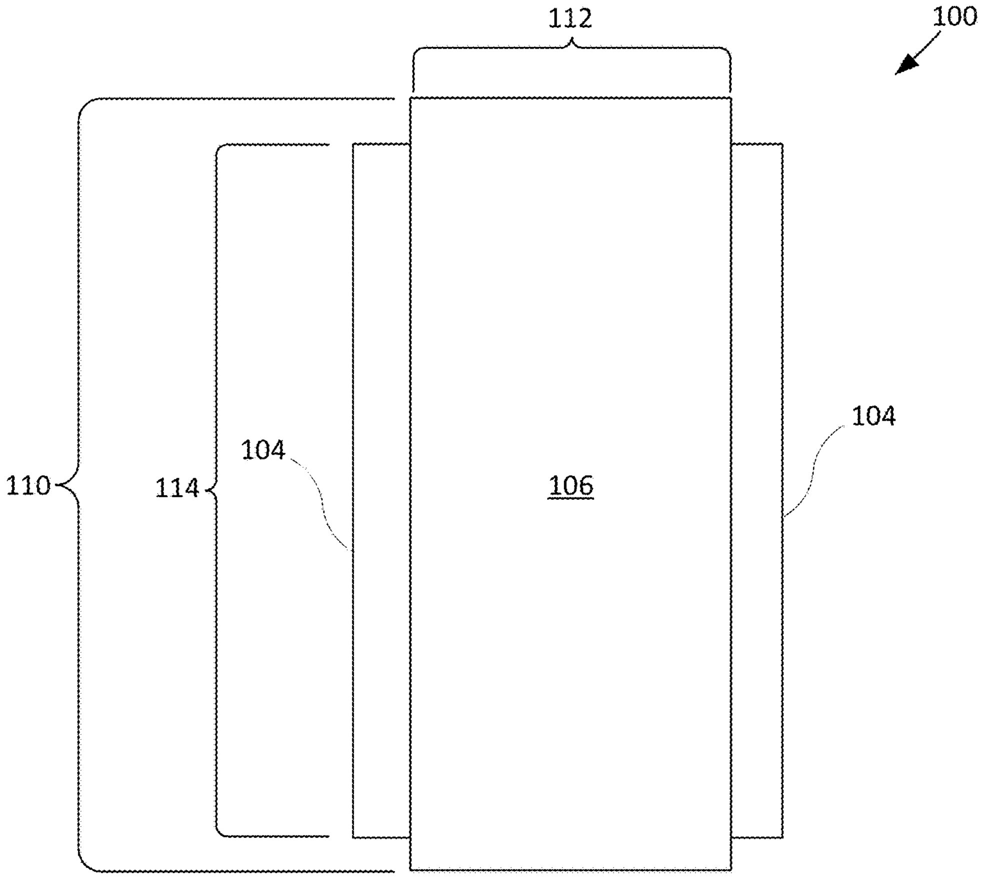
FIG. 1B is a top view diagram illustrating the ballast system 100, in accordance with examples of the subject disclosure.

FIG. 1B is a top view diagram illustrating the ballast system 100, in accordance with examples of the subject disclosure. Generally, solar panels are rectangular in shape and have a length 110 that is greater than a width 112. Typically, solar panels 106 are oriented so that a long side with the length 110 is facing south (when in the Northern Hemisphere). In certain examples, the ballast device 104 is configured with a length 114 that is substantially equivalent to a length 110 of the solar panel 106. As used herein, the terms "substantial" and "substantially," when referring to a numerical value, includes a range of values that are within ±15% of the referenced value. For example, if the solar panel 106 has a length 110 of sixty inches, and the length 114 of the ballast device 104 is "substantially equivalent" to the length 110 of the solar panel, then the length 114 of the ballast device 104 is in the range of between about 51" and 69". In other examples, the length 114 of the ballast device 104 may be any suitable length. Although a single ballast device 104 is depicted running substantially the entire length of a side of the solar panel 106, the single ballast device 104 may be replaced with two or more smaller ballast devices 104.

Beneficially, a ballast device 104 that has a length 114 that is substantially equivalent to the length 110 of the solar panel functions to stop wind from getting under the one or more solar panels 106 and lifting the solar panels 106 off the ground or other surface.

Figure 2A:
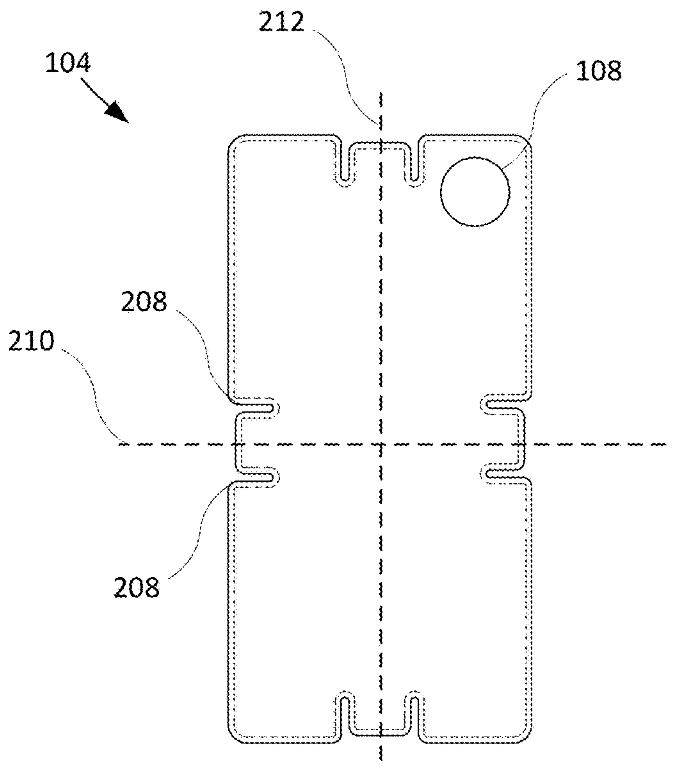
FIG. 2A is a cross-sectional diagram of the ballast device, in accordance with examples of the subject disclosure.
Figure 2B:
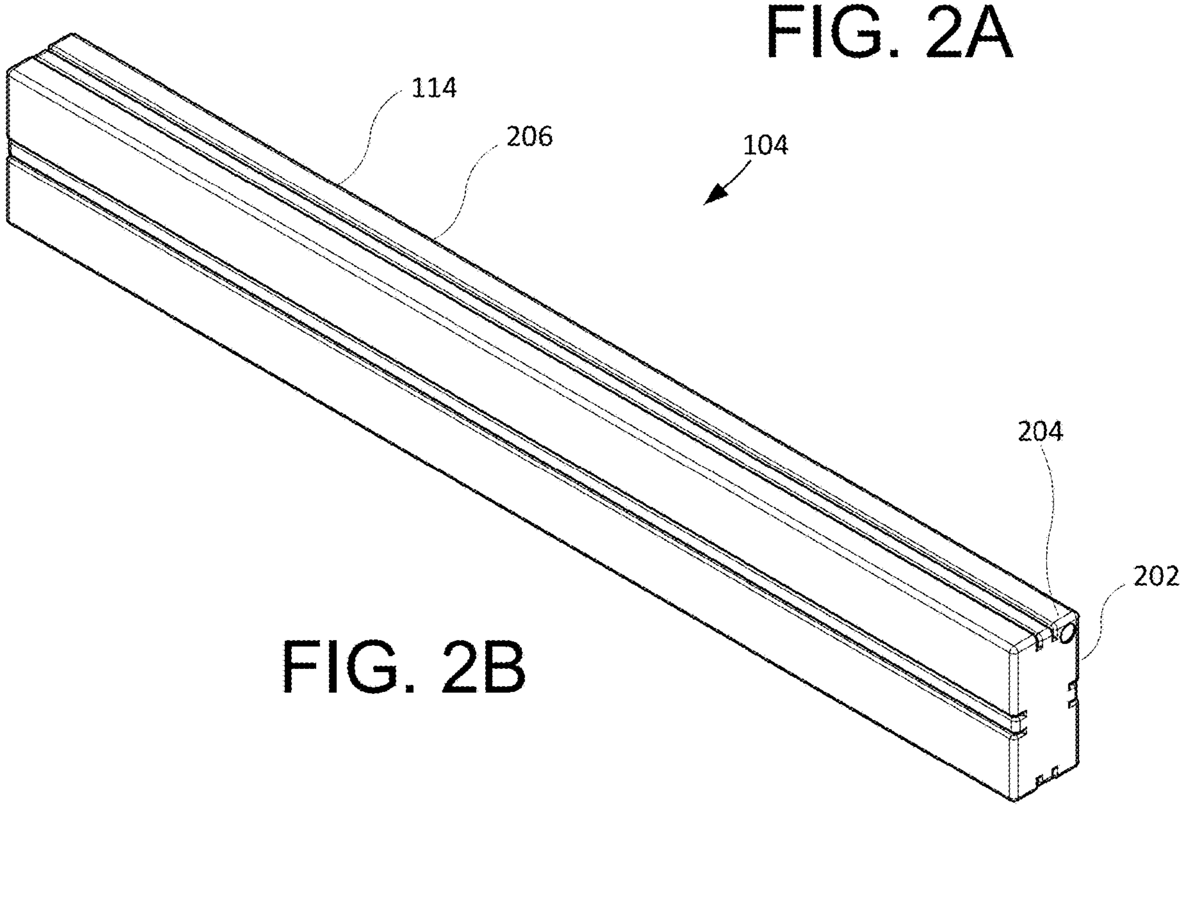
FIG. 2B is a perspective view diagram of the ballast device, in accordance with examples of the subject disclosure.

FIGS. 2A and 2B are depictions (a cross-sectional view and a perspective view, respectively) of the ballast device 104, in accordance with examples of the subject disclosure. The ballast device 104, in certain examples, has sides 202, 204, and 206 with a corresponding height, width, and length 114. As discussed above, the ballast device 104 may be a tank having an opening that is configured to receive a flowable material. In other examples, the ballast device 104 is a solid piece of suitable material, such as concrete. The opening 108, in certain examples, is disposed in a corner of an end surface of the ballast device 104. This beneficially allows the opening 108 to be in an elevated position relative to the ground in either a horizontal or vertical position of the ballast device 104. Stated differently, the opening 108 is able to be positioned away from the ground or mounting surface and allow the ballast device 104 to be filled with the flowable material.

The ballast device 104, when configured as a tank, may be formed of any material suitable to hold a significant amount of water. In certain examples, the ballast device 104 is a tank formed of a high-density polyethylene. In other examples, the ballast device 104 is formed of metal or a metal alloy.

One or more slots 208 may be disposed on each side of the ballast device 104. Each of the slots 208 may extend along external surfaces of the lengthwise side 206. The one or more slots 208 are configured to receive a portion of the bracket 102. The slots may have a depth that extends toward a longitudinal axis a distance in the range of between about 0.1 and 3 inches. In other examples, the depth of each slot is selectable according to a desired bracket size. In the example of a polymer-based ballast device, the slot 208 are configured to receive a barbed bracket that “bites” into the sides of the slots 208.

Beneficially, the positioning of the one or more slots 208 allows for the use of a bracket 102 that may couple together adjacent ballast devices 104 for the purpose of stacking the ballast devices 104. Such an H-shaped bracket is described below in greater detail. In alternative examples, a bracket that is I-shaped may be used to engage a single slot in each of the adjoining ballast devices 104.

Referring to FIG. 2A, the cross-sectional profile of the ballast device 104 may be symmetric, save for the opening 108, about the horizontal axis 210 and/or the vertical axis 212. Such a symmetric configuration beneficially improves the efficiency of the manufacturing process of the ballast device 104.

Figure 3A:
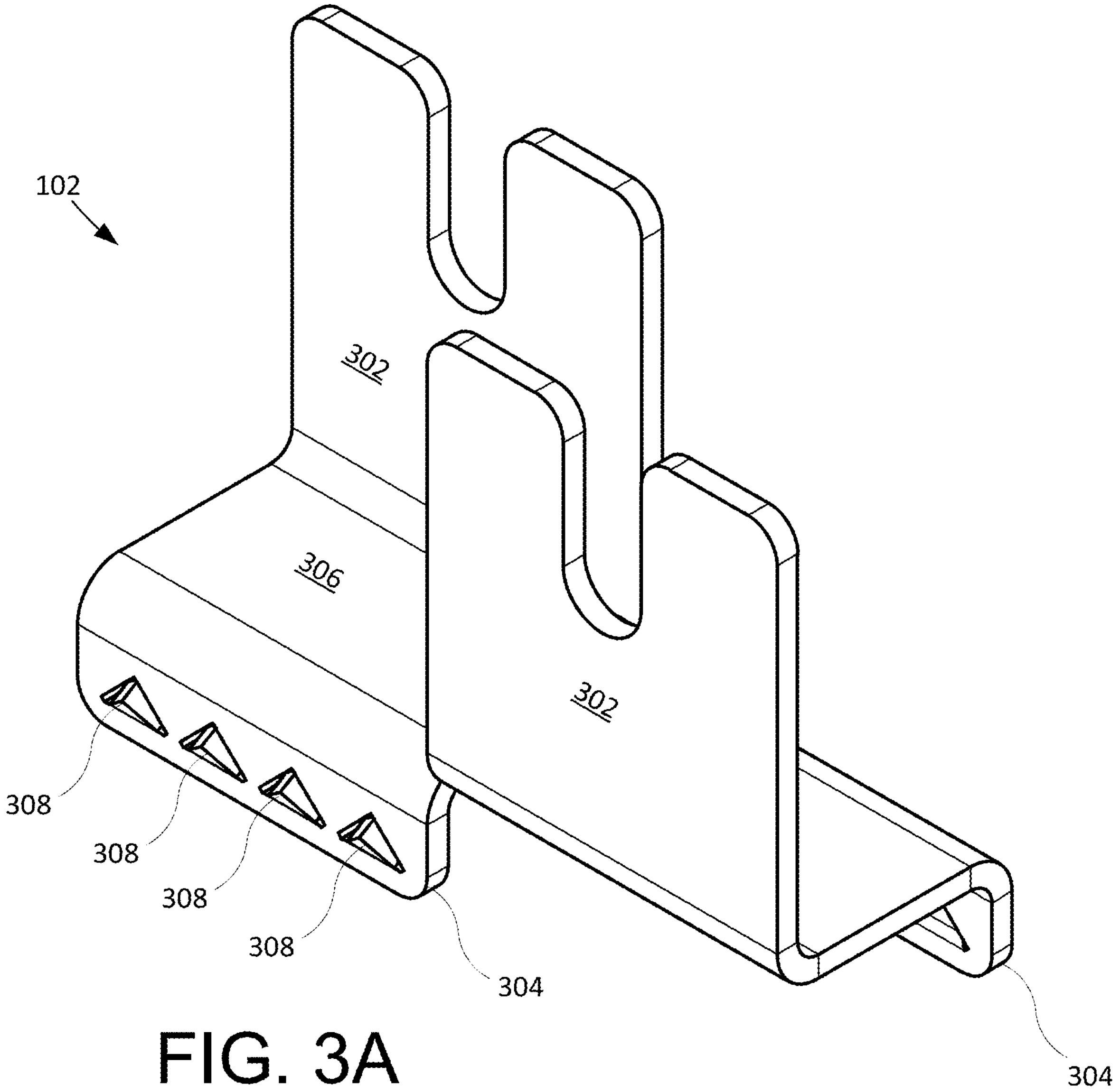
FIG. 3A is a perspective view diagram illustrating one example of the bracket, in accordance with examples of the subject disclosure.

FIG. 3A is a perspective view diagram illustrating one example of the bracket 102, in accordance with examples of the subject disclosure. The bracket 102, in certain examples, is formed of a rigid material capable of connecting with and supporting a solar panel 106. The rigid material, in some examples, is a metal or metal alloy. The H-shaped cross-sectional profile described above with respect to FIG. 1A in certain examples includes offset upper arms 302 and offset lower arms 304. The arms 302, 304 extend outward in a generally perpendicular direction from a substantially planar base 306.

The base 306 and the lower arms 304 are configured to engage the slots of the ballast device 104. In certain examples, the lower arms 304 are configured with one or more barbs 308 that extend outward from the lower arms 304 and engage surface of a slot 208 and fix the bracket 102 with the ballast device 104. The barbs 308, in certain examples, are features that are punched in the surface of the lower arm 304. In other examples, an adhesive may be utilized to secure the position of the bracket 102 with respect to the ballast device 104. In yet other examples, the bracket 102 may be formed with five or more total arms, instead of the depicted four arms 302, 304. For example, a total of eight arms may be used. However, the depicted example is efficient from a manufacturing point of view, as the depicted bracket 102 may be formed by bending arms 302, 304 from a single piece of sheet metal.

Figure 3B:
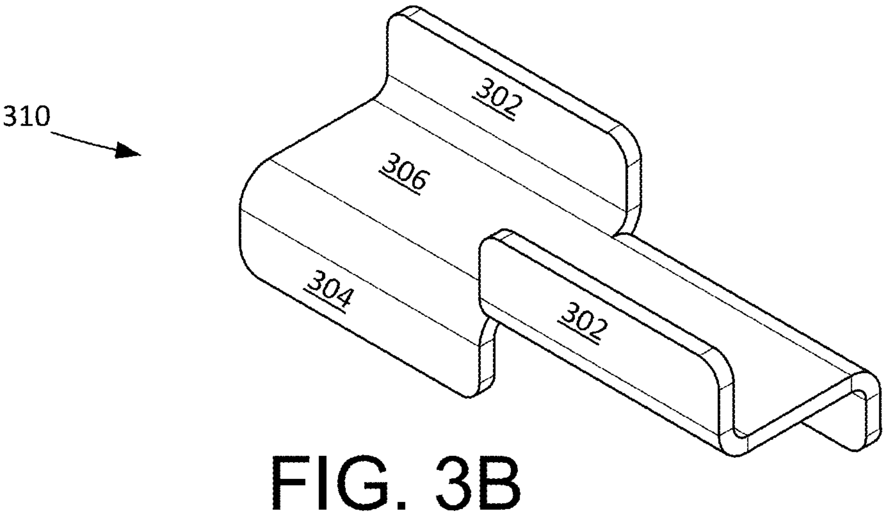
FIG. 3B is a perspective view diagram illustrating another example of an H-shaped bracket, in accordance with examples of the subject disclosure.

FIG. 3B is a perspective view diagram illustrating another example of an H-shaped bracket 310, in accordance with examples of the subject disclosure. The bracket 310 is similar to the above described bracket 102, but with shorter upper arms. Such a bracket 310 is useful for coupling together two adjacent ballast devices 104. The bracket 310 is formed of a rigid material capable of connecting with and supporting two ballast devices 104. The rigid material, in some examples, is a metal or metal alloy. The H-shaped cross-sectional profile described above with respect to FIG. 1A in certain examples includes offset upper arms 302 and offset lower arms 304. The arms 302, 304 extend outward in a generally perpendicular direction from a substantially planar base 306.

Figure 4A:
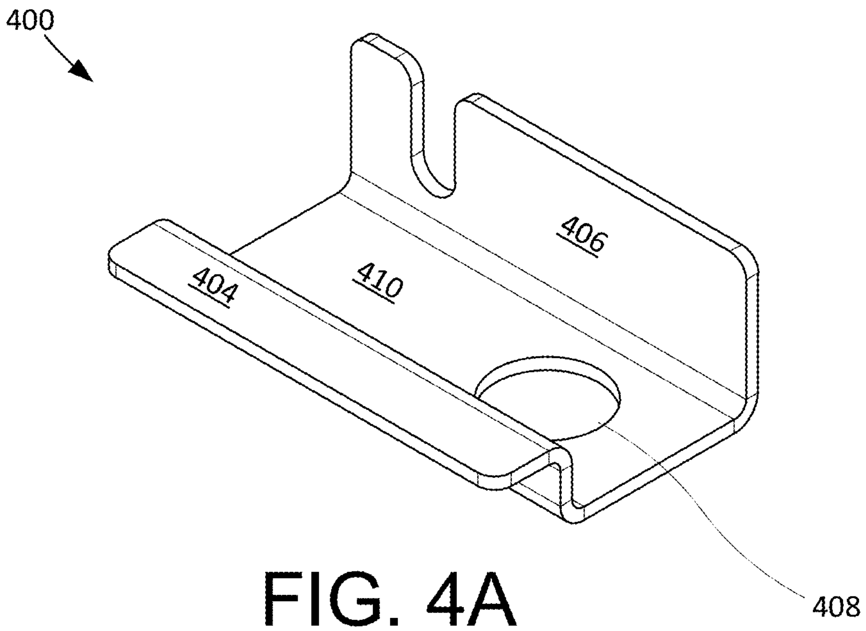
FIG. 4A is a perspective view diagram of an example of an end bracket, in accordance with examples of the subject disclosure.
Figure 4B:
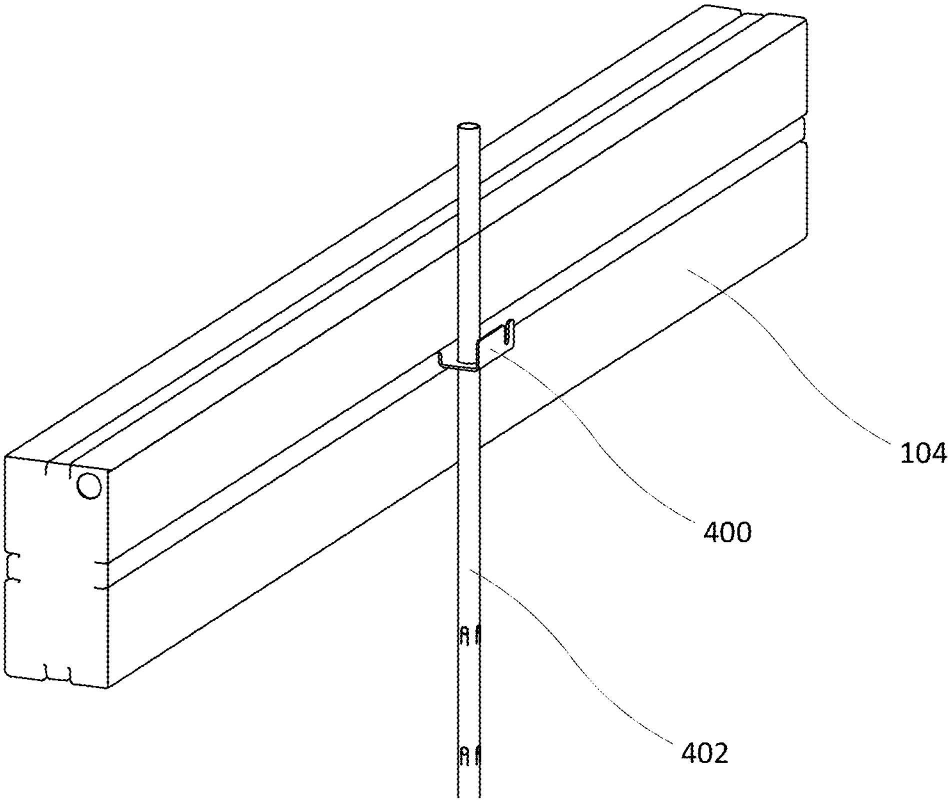
FIG. 4B is a perspective view diagram of another example of an end bracket, in accordance with examples of the subject disclosure.

FIGS. 4A and 4B are diagrams illustrating examples of an end bracket 400, in accordance with examples of the subject disclosure. The end bracket 400 is configured to insert into a slot of the ballast device 104 and couple to either a solar panel 106, or an anchoring device 402. For example, the end bracket 400 may be secured to a pole or other post that is embedded into the ground or otherwise connected with the mounting surface (i.e., a roof of a building). Although the pole and the ballast device 104 are depicted in a substantially vertical orientation, it is contemplated that the ballast device 104 and the pole 402 may be fixed at an angle with respect to a vertical axis (e.g., 20-30 degrees off a vertical axis). Such an angled orientation is beneficial in preventing wind from lifting the solar array off of the mounting surface because wind on the angled surface creates a downward force if angled away from the direction of the wind.

In certain examples, the end bracket 400 has an arm 404 for inserting into a slot of the ballast device 104, and an arm 406 for coupling with a solar panel 106 or an anchoring device. In other examples, the end bracket 400 is provided with an opening 408 for receiving the pole 402. The arm 404 may have a portion that is coplanar with a base 410 of the end bracket 400. In certain examples, the second arm 406 is substantially perpendicular to the base 410.

Figure 5A:
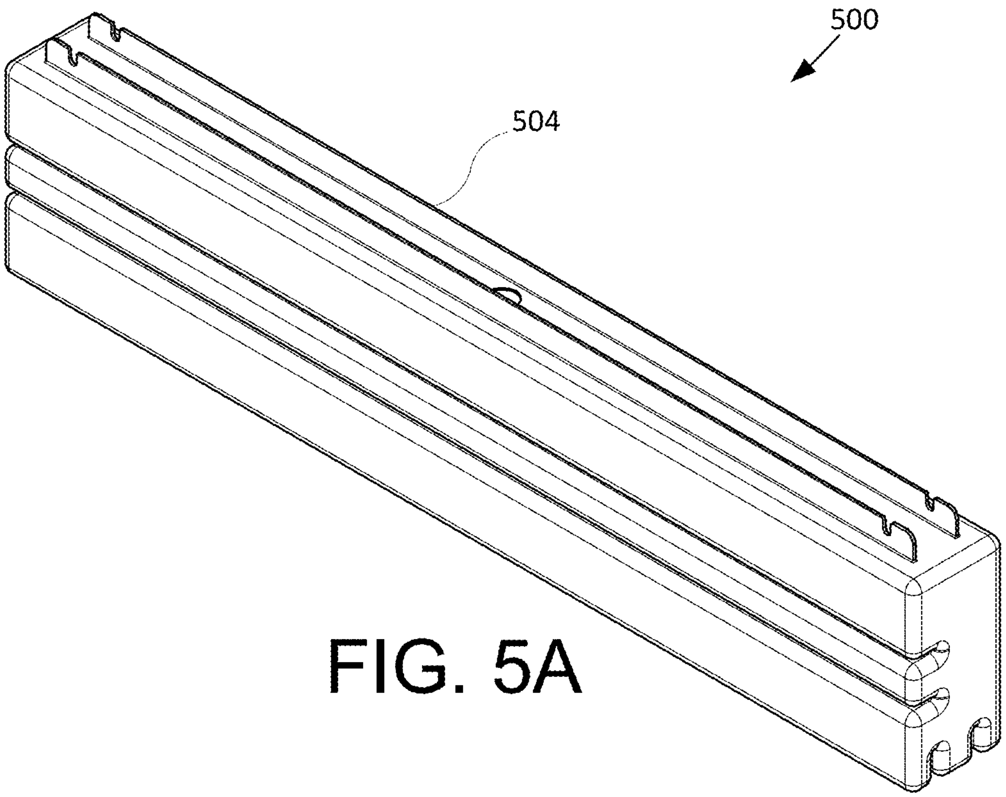
FIG. 5A is a perspective view diagram of another example of the ballast device, in accordance with examples of the subject disclosure.
Figure 5B:
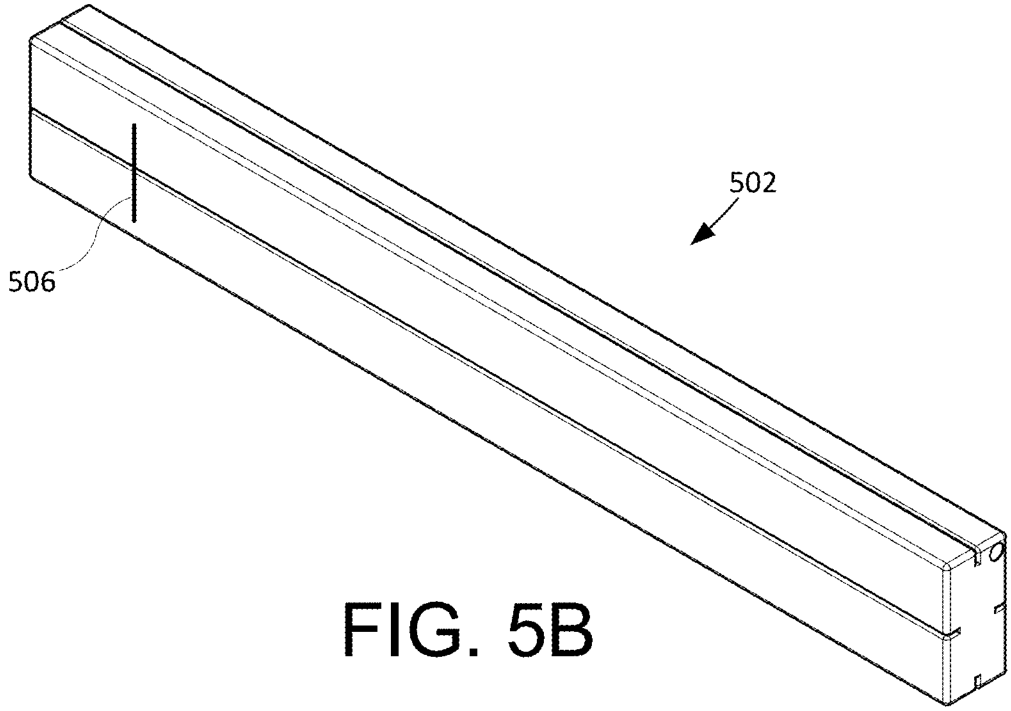
FIG. 5B is a perspective view diagram of another example of the ballast device, in accordance with examples of the subject disclosure.

FIGS. 5A and 5B are depictions of other examples of the ballast device, in accordance with examples of the subject disclosure. The ballast device 500, in certain examples, has a non-symmetrical cross-sectional profile. Stated differently, the ballast device 500 may be formed with a different number of slots on opposing sides of the ballast device 500. The ballast device 500, when configured as a tank, may be formed of any material suitable to hold a significant amount of water. In certain examples, the ballast device 104 is a tank formed of a high density polyethylene. In other examples, the ballast device 104 is formed of metal or a metal alloy.

In certain examples, the ballast device 500 is configured with integral ridges 504 extending outward from a surface of the ballast device 500 and configured to either couple with a solar panel 106 or with another ballast device 500. The ballast device 502 of FIG. 5B is an example of a device with a single slot on each side. It is contemplated that the ballast devices described herein may be provided with any suitable number of longitudinally running slots. It is also contemplated that the one or more slots are oriented latitudinally, as depicted by line 506.

Figure 6A:
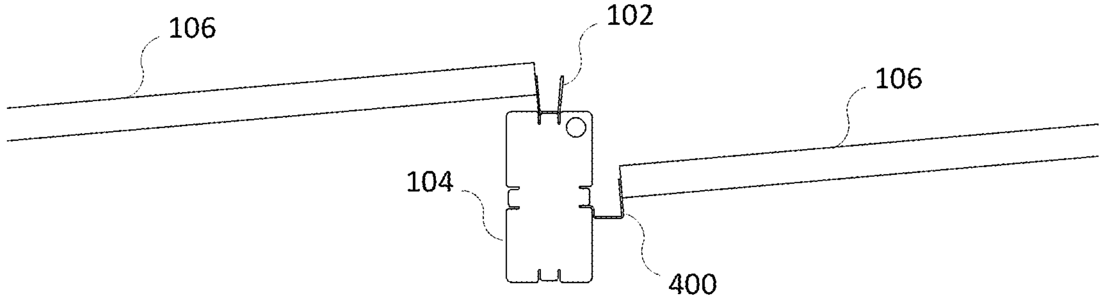
FIG. 6A is a side view diagram illustrating one example of a ballast device orientation in a solar array, in accordance with examples of the subject disclosure.

FIG. 6A is a side view diagram illustrating one example of a ballast device 104 orientation in a solar array, in accordance with examples of the subject disclosure. In certain examples, the ballast device 104 is oriented in a vertical position so that the edge of one solar panel 106 is coupled to the top of the ballast device 104, and the edge of the other solar panel 106 is coupled to a side of the ballast device 104. In such a configuration, the upper solar panel 106 is coupled via an H-shaped bracket 102 and the lower solar panel is coupled via an end bracket 400. The end bracket 400 may be inserted into either the upper or lower slot, according to a desired solar panel angle. The repeating pattern depicted here resembles a sawtooth profile that rises and then drops. This beneficially allows for a large array of solar panels to be tilted towards the path of the sun while keeping the solar array close to the mounting surface.

Figure 6B:
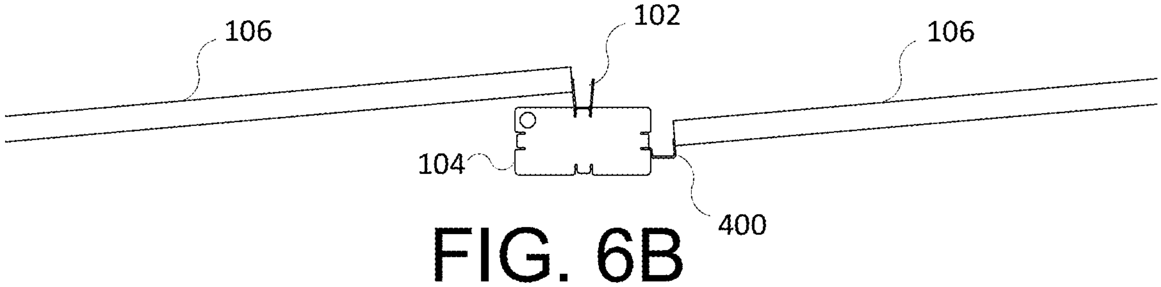
FIG. 6B is a side view diagram illustrating one example of a ballast device orientation in a solar array, in accordance with examples of the subject disclosure.

FIG. 6B is a side view diagram illustrating one example of a ballast device 104 orientation in a solar array, in accordance with examples of the subject disclosure. In certain examples, the ballast device 104 is oriented in a horizontal position so that the edge of one solar panel 106 is coupled to the top of the ballast device 104, and the edge of the other solar panel 106 is coupled to a side of the ballast device 104. In such a configuration, the upper solar panel 106 is coupled via an H-shaped bracket 102 and the lower solar panel is coupled via an end bracket 400. The end bracket 400 may be inserted into either the upper or lower slot, according to a desired solar panel angle. The repeating pattern depicted here resembles a sawtooth profile that rises and then drops. This beneficially allows for a large array of solar panels to be tilted towards the path of the sun while keeping the solar array close to the mounting surface.

Figure 6C:
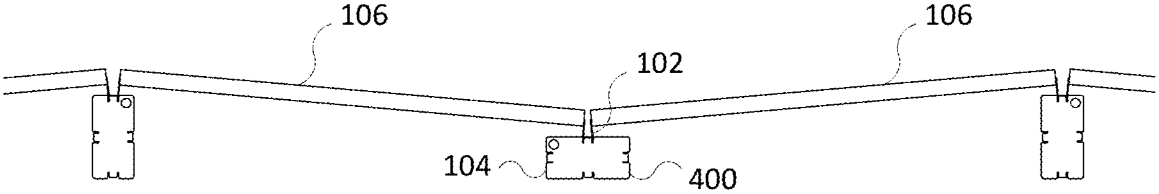
FIG. 6C is a side view diagram illustrating one example of a ballast device orientation in a solar array, in accordance with examples of the subject disclosure.

FIG. 6C is a side view diagram illustrating one example of a ballast device 104 orientation in a solar array, in accordance with examples of the subject disclosure. In certain examples, the ballast devices 104 are oriented in alternating horizontal and vertical positions. In such a configuration, the upper solar panel 106 is coupled via an H-shaped bracket 102 and the lower solar panel is also coupled via an H-shaped bracket 102. In certain examples, a single bracket 102 is configured to support adjacent solar panels 106. The repeating pattern depicted here resembles a W profile that rises and falls at the same angle. Such a rising and falling pattern beneficially resists lift-off due to wind because lift forces on a rising panel are counteracted by the downward forces on a falling panel.

Figure 7:
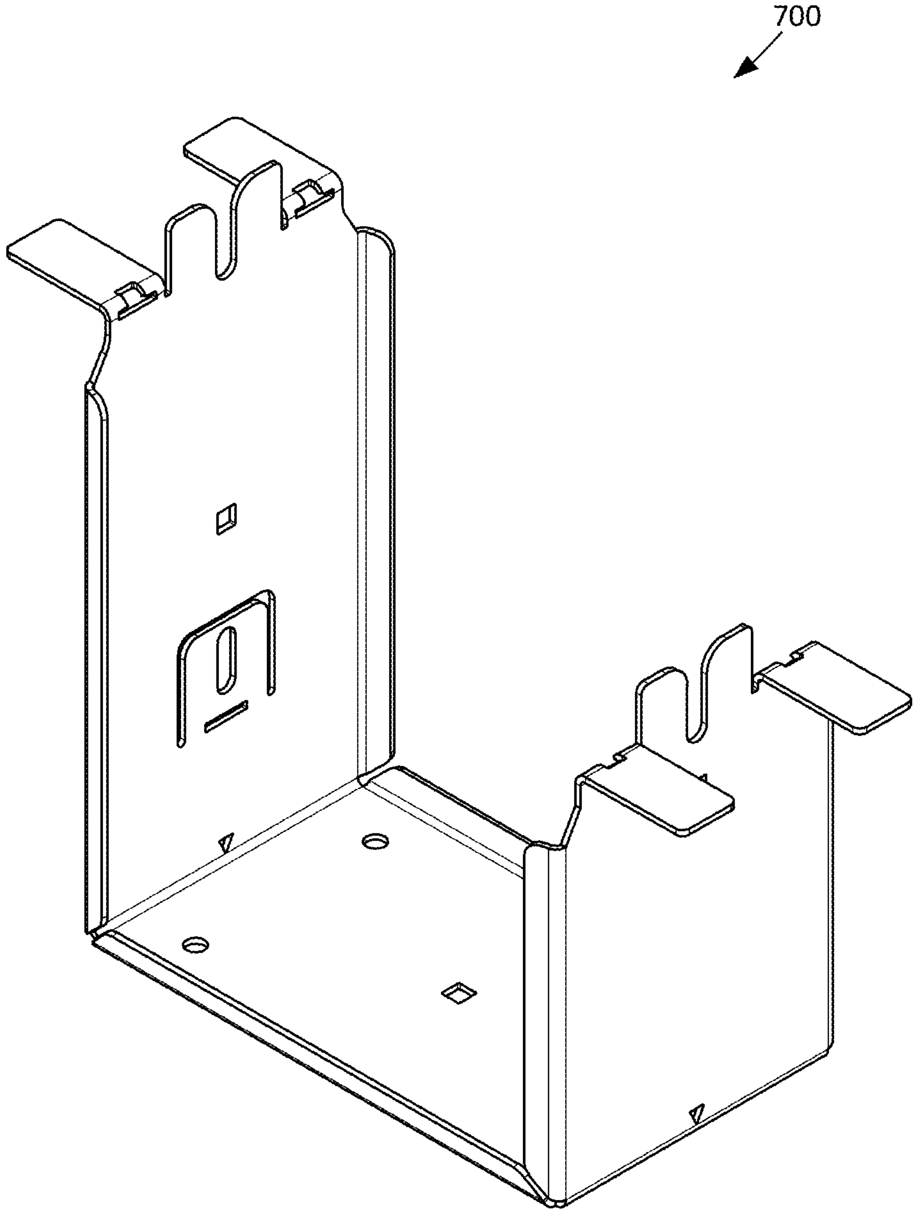
FIG. 7 is a perspective view diagram of a ballast base bracket for use with solid ballast devices, in accordance with examples of the subject disclosure.
Figure 8A:
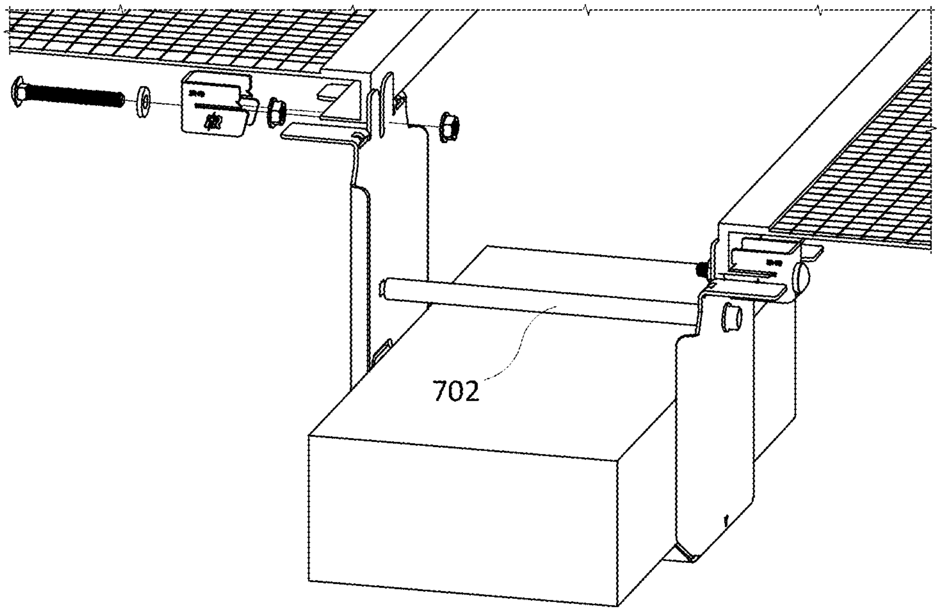
FIG. 8A is a perspective view diagram illustrating one example of a bracket and a ballast block, in accordance with examples of the subject disclosure.

FIG. 7 is a perspective view diagram of a ballast base bracket 700 for use with solid ballast devices, in accordance with examples of the subject disclosure. As described above with reference to FIG. 1A, the ballast device may be, for example, a concrete block. The ballast base bracket 700 is contoured to accept at least one ballast device or weight, and an optional handle 702 (see FIG. 8A) is attached to the base bracket 700 to add additional clamping force on the ballast device. The ballast base bracket 700 may incorporate an opening in the bracket 700 itself for carrying the ballast weight and bracket together as one. The handle 702 beneficially allows for proper lifting and carrying one assembly on each side of the body while using a person's legs to lift up to two ballasted bracket assemblies at the same time, and delivering to the location they will be deployed. Common ballast systems require each ballast base and each block to be carried to deployment area separately.

Figure 8B:
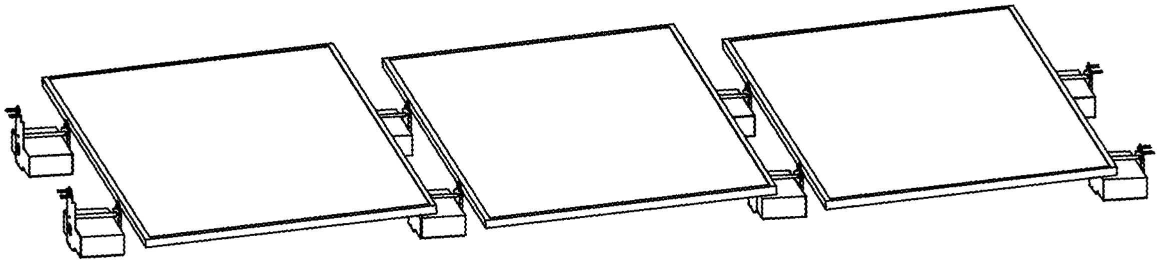
FIG. 8B is a perspective view diagram illustrating one example of a solar panel array, in accordance with examples of the subject disclosure.

The handle 702 is sized slightly smaller than the width of the base bracket 700, thereby causing a clamping action on the ballast block, forming one structural bracket assembly. The optional handle 702 increases clamping forces and adds even more structural integrity to the base bracket 700, especially if no ballast block is utilized and the bracket 700 is glued or screwed directly to the roof's surface, the handle 702 boxes or closes off the brackets open end for better racking strength. The handle 702 when attached or bolted properly provides a clamping force on the two upright legs to help keep them vertical and well supported higher up on the base bracket 700. The disclosed base bracket 700 has a large flat bottom to prevent damage to the roofs surface under snow load or from ballast loads. FIG. 8B is a perspective view diagram illustrating an array of solar panels 106 utilizing the bracket 700 and ballast weights, as described above with respect to FIGS. 7 and 8A.

Figure 9:
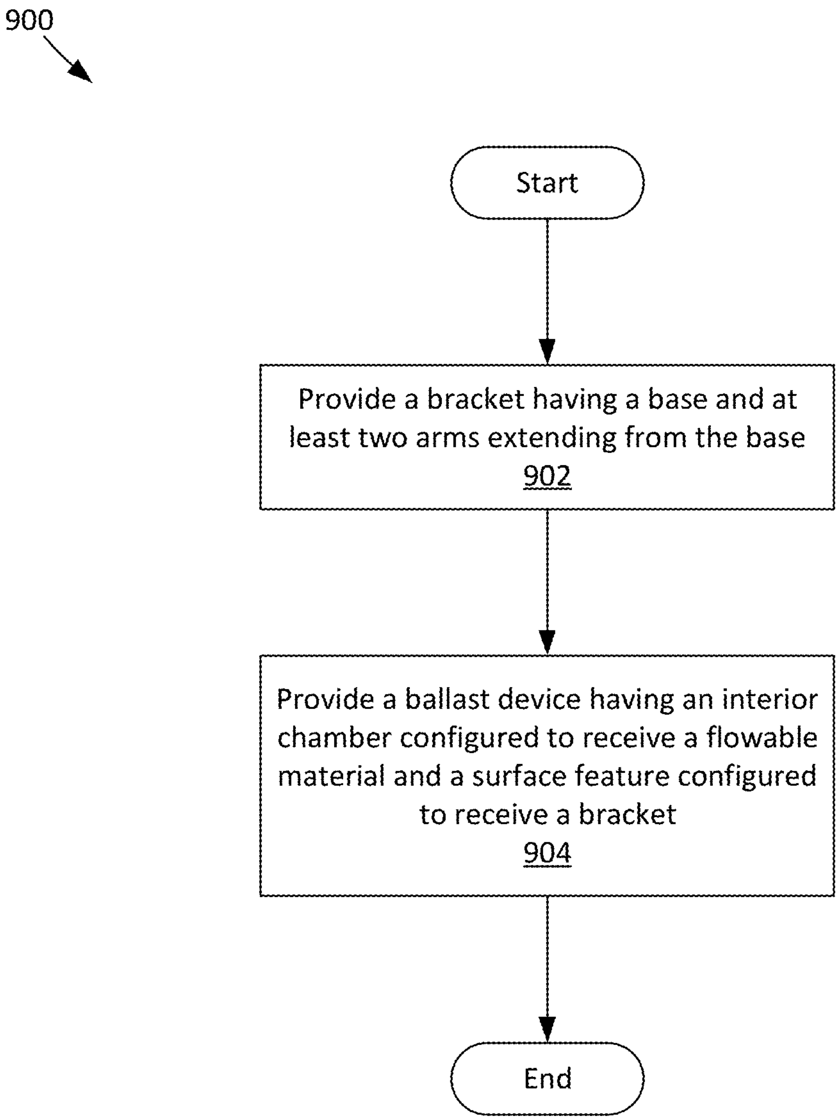
FIG. 9 is a schematic flowchart diagram illustrating one example of a method of providing a ballasted solar module bracket and ballast device in accordance with examples of the subject disclosure.

FIG. 9 is a schematic flowchart diagram illustrating one example of a method 900 of providing a ballasted solar module bracket and ballast device in accordance with examples of the subject disclosure. The method 900 begins and, at block 902, a bracket having a base and at least two arms extending outward from the base is provided. At block 904, a ballast device is provided having an interior chamber configured to receive a flowable material and a surface feature configured to receive a bracket.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A solar module mounting system comprising:

a bracket having a base and at least two arms extending outward from the base at a substantially perpendicular angle with reference to the base, where an arm of the at least two arms is configured to couple with a solar module; and a ballast device having an interior chamber configured to receive a flowable material, and where the ballast device has at least one surface feature configured to receive the bracket and secure the solar module to a mounting surface.

2. The solar module mounting system of claim 1, where the solar module has a length and a width, and where the ballast device has a length substantially equal to the length of the solar module.

3. The solar module mounting system of claim 2, where the ballast device is disposed on the mounting surface and at least partially below a top surface of the solar module to form a wind break and limit wind penetration underneath the solar module.

4. The solar module mounting system of claim 3, further comprising a second ballast device disposed along an opposite side of the solar module from the ballast device.

5. The solar module mounting system of claim 4, where the second ballast device is installed at an angle with respect to a vertical line to create downward force on the solar module when the second ballast device is impinged by wind.

6. The solar module mounting system of claim 1, where at least one arm of the at least two arms comprises one or more barbs configured to lock the bracket into the at least one surface feature.

7. The solar module mounting system of claim 6, where the at least one surface feature comprises a slot configured to receive at least one arm of the bracket.

8. The solar module mounting system of claim 1, further comprising an end bracket having a base where the base defines a first plane, an arm extending upward from the base, and a second arm that defines a second plane that is parallel with the first plane, and where the end bracket is configured to couple with an anchoring device.

9. The solar module mounting system of claim 1, where the ballast device comprises at least one opening for receiving the flowable material.

10. The solar module mounting system of claim 1, where the ballast device comprises an elongated rectangular shape.

11. A ballast device for a solar module having a length and a width, the ballast device comprising:

a ballast device having an interior chamber configured to receive a flowable material, and where the ballast device has at least one integral surface feature configured to receive a bracket for securing the solar module, where the bracket includes a base and at least two arms extending outward from the base at a substantially perpendicular angle with reference to the base.

12. The ballast device of claim 11, where the ballast device has a length substantially equal to one of either the length or the width of the solar module.

13. The ballast device of claim 12, where the ballast device comprises an elongated rectangular shape.

14. The ballast device of claim 13, where the ballast device comprises at least one opening for receiving the flowable material.

15. The ballast device of claim 14, where the at least one integral surface feature comprises a slot configured to receive at least one arm of the bracket.

16. The ballast device of claim 15, where the ballast device is disposed on a mounting surface and at least partially below a top surface of the solar module to form a wind break and limit wind penetration underneath the solar module.

17. The ballast device of claim 16, further comprising a second ballast device disposed along an opposite side of the solar module from the ballast device.

18. The ballast device of claim 17, where the second ballast device is installed at an angle with respect to a vertical line to create a downward force on the solar module when the second ballast device is impinged by wind.

19. The ballast device of claim 18, further comprising a third ballast device disposed on top of the second ballast device.

* * * * *